Oct. 28, 1930. E. E. CLEMENT Re. 17,847

RADIOPHONE SYSTEM

Original Filed Aug. 14, 1922 6 Sheets-Sheet 1

Inventor

Edward E. Clement

RADIOPHONE SYSTEM

Original Filed Aug. 14, 1922 6 Sheets-Sheet 2

Inventor
Edward E. Clement

Oct. 28, 1930. E. E. CLEMENT Re. 17,847

RADIOPHONE SYSTEM

Original Filed Aug. 14, 1922 6 Sheets-Sheet 3

Inventor

Edward E. Clement

Oct. 28, 1930. E. E. CLEMENT Re. 17,847

RADIOPHONE SYSTEM

Original Filed Aug. 14, 1922 6 Sheets-Sheet 4

Inventor

Edward E. Clement

RADIOPHONE SYSTEM

Original Filed Aug. 14, 1922 6 Sheets-Sheet 5

Inventor

Edward E. Clement

RADIOPHONE SYSTEM

Original Filed Aug. 14, 1922 6 Sheets-Sheet 6

Inventor

Edward E. Clement

Reissued Oct. 28, 1930 Re. 17,847

UNITED STATES PATENT OFFICE

EDWARD E. CLEMENT, OF WASHINGTON, DISTRICT OF COLUMBIA, ASSIGNOR TO EDWARD F. COLLADAY, OF WASHINGTON, DISTRICT OF COLUMBIA

RADIOPHONE SYSTEM

Original No. 1,522,357, dated January 6, 1925, Serial No. 581,829, filed August 14, 1922. Renewed July 22, 1924. Reissue No. 16,231, dated December 15, 1925, Serial No. 42,100, filed July 7, 1925. This application for reissue filed December 31, 1926. Serial No. 158,350.

My invention relates to systems of communication, and particularly to telephone and radio systems.

It has for its objects, among others, the following: To organize radio broadcasting service on a commercial basis, and to control the service units or receiving stations so that the various contingencies incidental to commercial operation may be efficiently met, such as maintenance, supervision, and the imposition and collection of charges; to localize each unit of a system, so that it may be tested and supervised; to standardize the distributed unit agencies in a system, while enabling them to receive messages broadcasted on various wave lengths; to control radio broadcasting so that it may supplement in organized service existing telephone exchange systems in such manner that the Government, in time of public need, may take over such radio broadcasting systems on an organized basis, and operate or supervise the same, without disturbance of the telephone service.

Incidental objects are to enable transition, from wired to so-called wireless methods of communication to be accomplished without substantial changes in practice, or injury to investment; and to ensure the proper and natural organization of radio systems when such transition occurs.

The foregoing objects are attained by the method of operation to be hereinafter described, which, it is to be understood, is typical, and is to be taken as such, for purposes of definition and not of limitation of the invention. According to this method I provide a system having for its basis the distribution among regular subscribers in localized areas, of standardized receiving instruments, each local area taking its broadcasting service from its own central station on such wave lengths as may be fixed and determined for that area. Each receiving station is connected to the local central station by a wire circuit through which both distribution and the control of the local station are attained. Without being subject to the limitations of an all-wire telephone system, this arrangement enables me conveniently to feed the substations with current from central for divers purposes, to control the receiving instruments at said stations from the central station, and to meter the radio service rendered for the purpose of making charges. Other benefits flowing from this arrangement will sufficiently appear from the detailed description hereinafter.

In order to make it possible for subscribers to both send and receive, without technical knowledge and without the necessity for operators' licenses, I provide the substation radiophone instrument with means for communicating over the wire circuits to the radio central station, where they may be connected through suitable amplifiers to broadcasting wave transmitters. This attains another object, that is to say, it gives the radio operator supervision and control of the message to be broadcasted as it comes over the telephone circuit, and before it goes on the wave transmitter.

The use of individual wire circuits as described renders it possible to locate each unit and by special means which will be described, to test and supervise said unit at the substation, as well as to disconnect and disable the same in case of necessity.

By using standardized receiving units, all uniformly tuned to the wave length of the local distributing station, I am able to provide said distributing station with sensitive and powerful receiving and relaying apparatus and circuits, whereby distant stations may be picked up, and various wave lengths may be received by variable tuning and their modulations relayed on the standard local wave length to the subscribers, who can receive and recognize the original messages thus relayed, without the necessity of variable tuning or highly sensitive instruments at their stations. With the above arrangement for distribution, by which the ultimate receiving instruments are reduced to the simplest form compatible with their purpose, I am enabled to concentrate apparatus requiring more elaboration and careful adjustment at the central stations. These are so related to existing high power broadcasting stations, and to others equipped as a part of the system, that uniform service and uniform programs may be distributed to the local central station according to a regular schedule, and the cost of the primary broadcasting, as well as any special programs put on by the local distributing stations, and the operation of the same will be borne by the subscribers by way of ultimate distribution in individual charges against them.

To control the radio communication in order that it may supplement existing wire agencies, I combine the above described radiophone system with a standard telephone exchange system, locating the standardized radiophone instruments at the telephone subscriber's stations, making their wire circuits the existing wire circuits of the telephone system, providing means whereby the use of the radiophone side of the system may be carried on to the fullest extent without interfering with the telephone side of the system, and without changing any of its circuits or apparatus. The telephone service is given precedence, so that whenever a subscriber is calling or called over his telephone line, all radio connections which might interfere are temporarily broken. From the telephone standpoint, the radiophone instruments may be regarded as extension telephones superimposed on the telephone lines at the subscribers' stations, and in a larger aspect the radiophone system as a whole may be regarded as a phantom duplication of the telephone exchange system upon which it is superimposed. It is intended that the two shall be controlled and operated by the same company, and since telephone circuits are usually idle more than 90 per cent of the time, an opportunity is thus afforded to increase the earnings of the existing physical equipment, as well as to produce substantial earnings on the additional investment required to install the radiophone instruments and switchboards.

This device for controlling and directing the radiophone service over existing lines of organized telephone exchange systems, renders it possible for the Government, in case of need, to take over the radio systems of the country as an organized unit, under trained expert management, and to supervise all transmission thereover without any interference with the general telephone service, and if necessary, without the knowledge of the subscribers thereto.

It will be apparent after reading the foregoing statement, that my incidental objects are attained as a necessary result of the general organization and arrangement described. The amount of capital invested and to be invested in telephone exchange systems in order to meet the demands of service is rapidly increasing, and it is not only highly desirable to increase the earning capacity of the physical telephone plant without a corresponding increase in the investment, but it is also necessary to forestall independent development of disorganized radio communication systems as well as their illicit or disorderly use.

With the foregoing arrangement, the management of and responsibility for the great bulk of the radio apparatus in the country will be placed in responsible hands organized and trained to exercise it efficiently according to law. For the detection of crime, for the general dissemination of intelligence, and to meet emergencies, including the national emergency of war, it is indispensable that such an orderly arrangement be brought about as will regulate the distribution and control of the apparatus, and the systematizing of the radio service on such a basis that it will pay for itself.

My invention is illustrated in the accompanying drawings in which.

Figure 1:
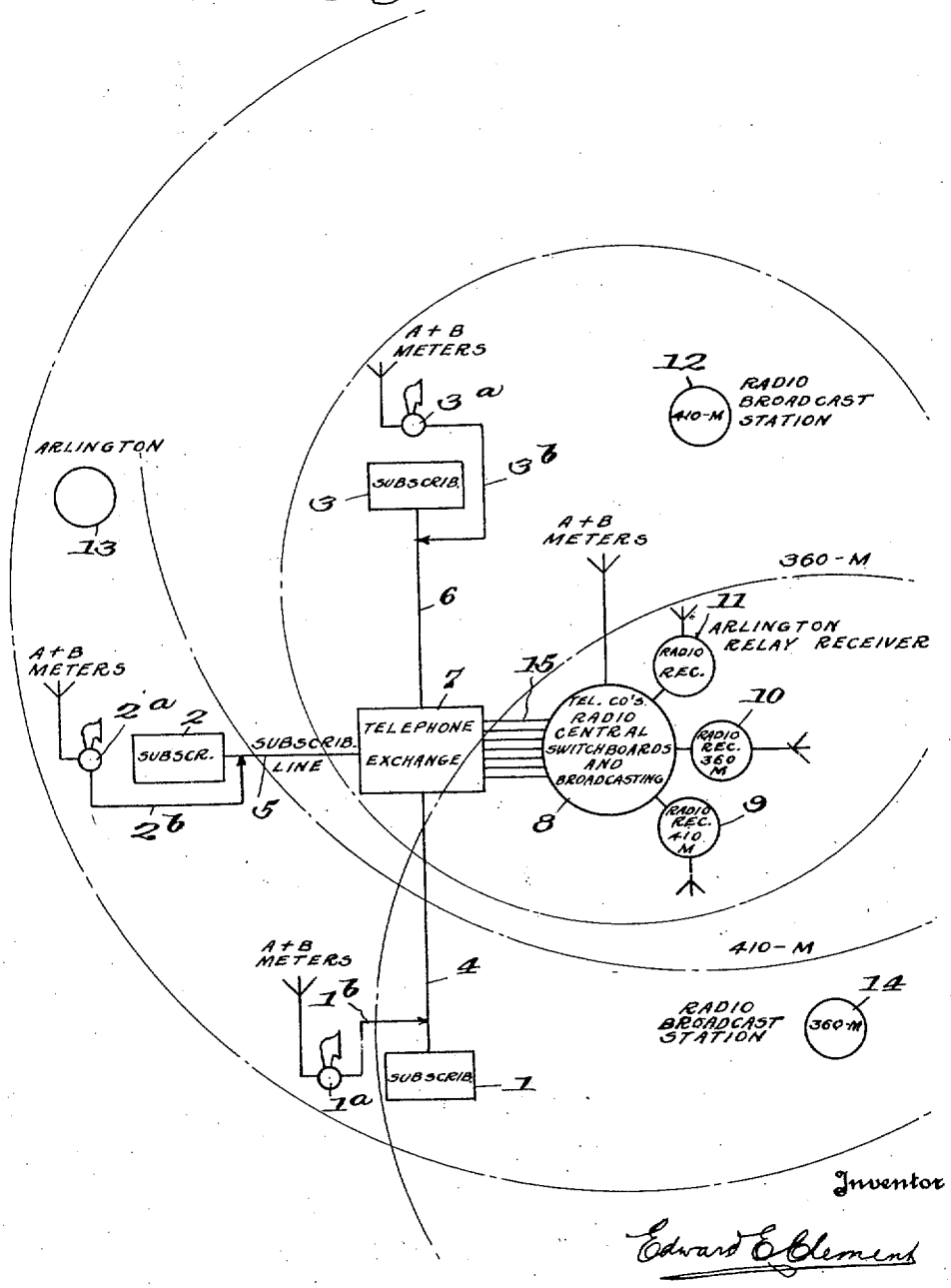
Fig. 1 is a diagram showing a general system embodying the same.
Figure 2:
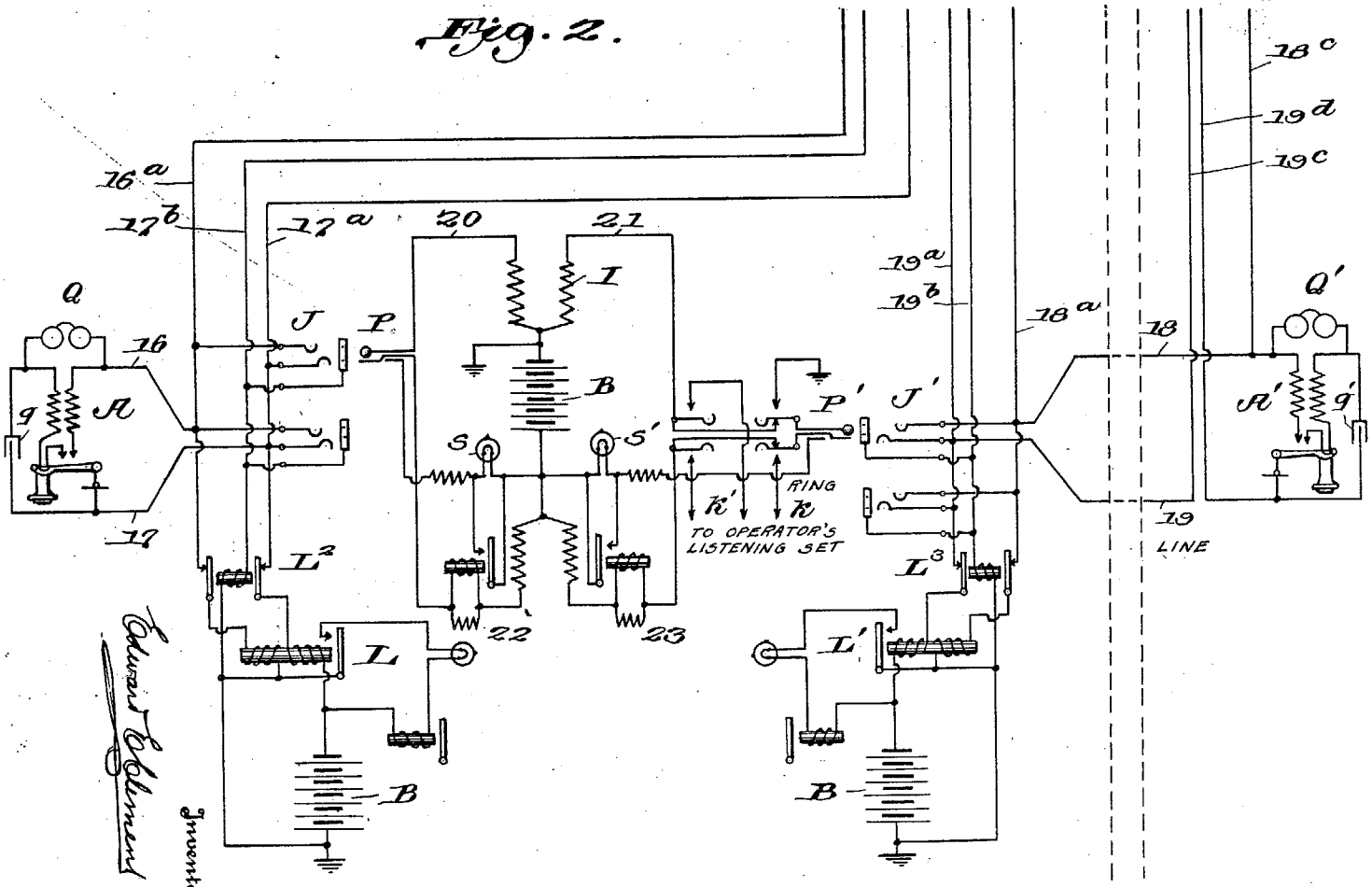
Fig. 2 is a diagram showing a central station telephone switchboard, subscribers' lines terminating thereon, and subscribers' telephones connected thereto.
Figure 3:
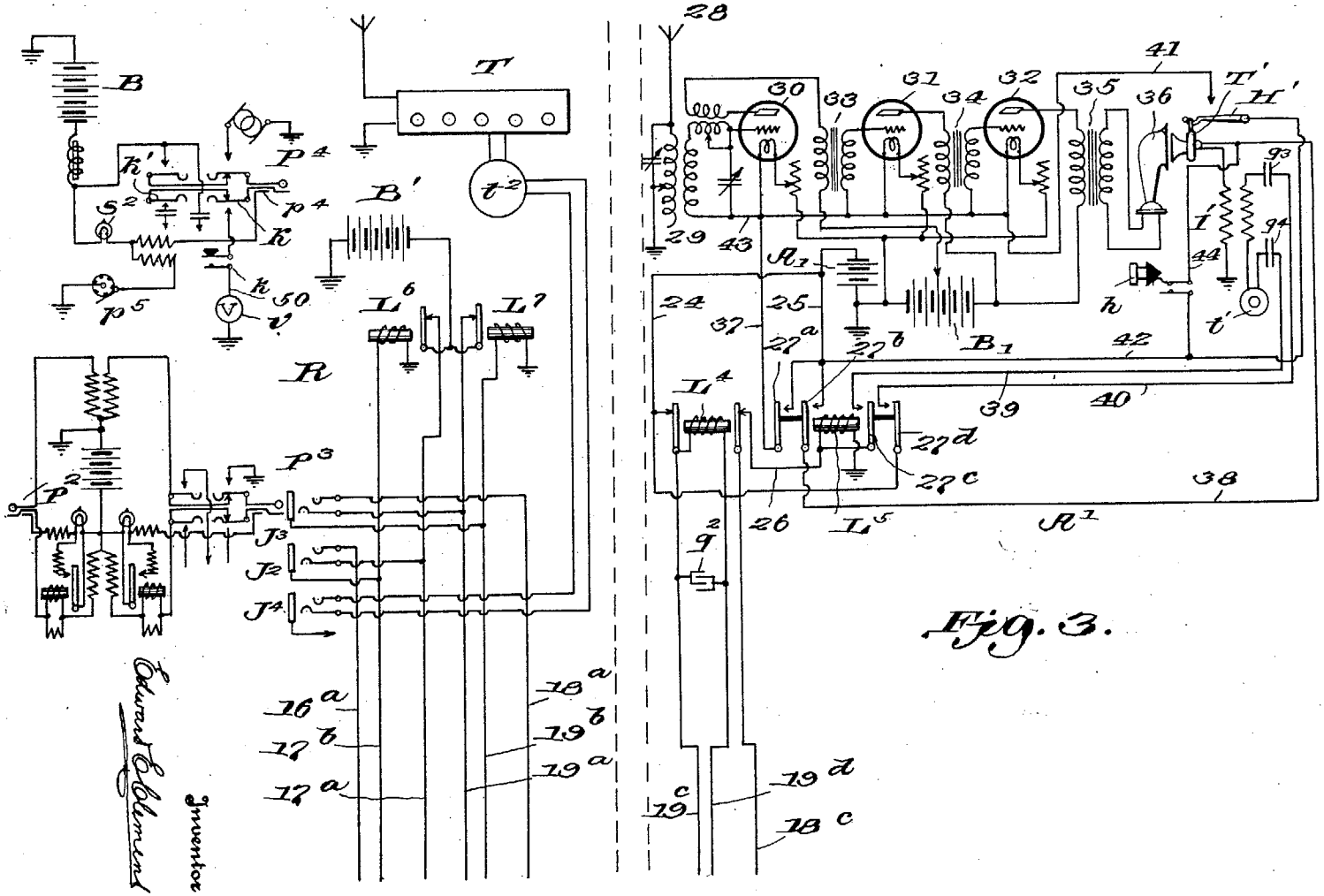
Fig. 3 is a diagram to be read in connection with Fig. 2, showing the radiophone set at one of the subscribers' stations, and the radio switchboard and associated equipment at the central station.

Referring to Fig. 1, 1, 2 and 3, represent telephone subscribers' stations connected by wires 4, 5 and 6 to the central telephone exchange 7, constituting the distributing center for the area in which local subscribers 1, 2, 3, etc., are located. Superposed upon this telephone system is a radiophone system comprising a central station 8 and subscribers' stations $1^a$, $2^a$, $3^a$, etc. The central radio station or exchange is provided with switchboards and a complete broadcasting equipment, and the subscribers' stations $1^a$, $2^a$, $3^a$, etc., are provided with receiving instruments all standardized for the same wave length, and adapted to respond to the waves radiated from the central station 8. The interrelation between the telephone system and the radiophone system is by means of physical connections indicated at $1^b$, $2^b$, and $3^b$, at the subscribers' stations, and multiples or trunk extensions 15 from the telephone exchange switchboards to the radiophone exchange switchboard in station No. 8. The detail of these connections will appear hereinafter, but it should be stated here that the system of connections is such that telephone wired traffic has the right of way over the wires, while the radio traffic has the right of way over the radio side of the system. The arrangement is such that the radio operator cannot interfere with telephone operation, nor can a telephone operator interfere with the radio operation, although under proper conditions each can act freely by way of borrowing facilities from the other. At all times, should a question of precedence arise, the apparatus is arranged so as automatically to cut off the radio connections and to leave the wired lines clear for telephonic use.

Stations 12, 13 and 14 in this figure are typical of indifferently located distant stations which may or may not be a part of this particular system. As the figure is typical only, no attempt has been made to give the geographical location of such stations or to show the actual arrangement and distribution of the telephone centers through which final broadcasting to the subscribers must take place. The main purpose of this figure is to crystallize the method employed by which the development of a very large number of related individual receiving stations is replaced by an orderly system of distribution through the telephone centers, whereby the individual receiving instruments are localized, maintained, controlled and supplied with definite service through regular channels, for which a definite charge can be made and collected in the manner usual in wired systems of communication. Inasmuch as the number of wave lengths available for transmission is limited in the present state of the art, advantage is taken of the organized system of wire distribution and localization to create a phantom system controlled and guided thereby.

Briefly stated, as indicated in Fig. 1, each radio central station or radio department of a telephone exchange, is not only provided with broadcasting equipment for its subscribers, but also with radio receivers adjustable by tuning to wave lengths allotted to such stations as those indicated at 12, 13 and 14, as well as primary stations maintained and operated by or under the direction of the telephone organization itself. By means understood in the art, messages received at the radio central stations are relayed on their respective standard wave lengths to the local subscribers.

Referring to Figs. 2 and 3, I have therein shown circuits of the central office and substation equipments and connections, Fig. 2 representing the telephone side of the system, and Fig. 3 the radiophone side of the system. Before proceeding to detail description it may be noted that in accordance with standard telephone practice, provision is made for keeping the telephone lines and central office circuits clear of all grounds or other disturbing connections during conversation. When the radiophone goes into service, by closing the filament switch its operation in receiving is identical with that of any radio receiver and in the event that use is made of any partial transmission of waves over the line wires, as will be hereinafter pointed out, said waves will be at a frequency above or below the limits of audition. In the present diagram, Figs. 2 to 9 inclusive, I have shown the circuits arranged with nothing but continuous current for radio purposes over the telephone line wires. This is the simplest form of control and the one nearest to present day telephone practice, and is absolutely certain not to produce any disturbance in adjacent conductors in the telephone cables. Each radiophone set is provided with a cut off relay energized when the telephone set goes into commission, either by calling or being called, and at the central office whenever the radio operator takes control of the line, he disables it in the usual manner by pulling up the cut off relay at the telephone switchboard, this however being subject to the condition that a special tone test may be put on, so that all operators may know that the line is held on the radio board, and subject to interruption for telephone connection. I prefer to use this tone test only with the radio operator's testing plug, because his regular connecting plug includes within its functions that of connecting a subscriber through the station amplifier to the broadcasting transmitting set, and a connection of this character should not be interrupted without permission.

Referring now to the diagrams, Fig. 2, A and A′ are two subscribers' stations connected by line wires 16—17 and 18—19 respectively to the central station C where they terminate on jacks J and J′. P—P′ are plugs forming the terminals of a cord circuit 20—21, 22—23, having a bridged repeating coil I, ringing and listening keys K and K′, supervisory signals *s*—*s*′ and bridging connection to the main battery B. The same battery is shown supplying current to the line relays L, L′, and through contacts at the cut off relays $L^2$, $L^3$ to the respective lines for calling purposes. In this system, when a subscriber takes down his receiver, the line relay lights its lamp, which is extinguished when the operator inserts the answering plug. Battery supply for the connected lines is thereafter taken through the cord circuit 20—22, 21—23, in a manner well understood in the art. When the substation telephones are out of service, with their receivers hanging on their hooks, the line circuits are conductively open for direct current, leaving the ringers Q and Q′ in circuit for alternating ringing current passing through the condensers $q$—$q'$.

Referring now to Fig. 3 it will be observed that the radio switchboard which I have designated generally by the letter R, is connected to the subscribers' lines by multiple taps marked $16^a$, and $17^a$, and $17^b$ and $18^a$, $19^a$, $19^b$. These terminate on multiple jacks $J^2$, $J^3$, corresponding to the multiple jacks on the telephone switchboard. It should be noted that throughout this system the tip wires 16 and 18 with their branches are connected to ground, while the sleeve wires 17 and 19 and their branches, are connected to battery. This is extended into the radio side of the system for the purpose of securing proper balance between the main battery or power plant of that side and the main battery or power plant of the telephone side of the system.

At the subscribers' stations taps are also taken off from the telephone terminals to the radiophone terminals as indicated at $18^c$, $19^c$, and $19^d$. (The radiophone is shown only at one substation for sake of simplicity of illustration.) The two branches $19^c$ and $19^d$ are taken from the sleeve or battery side of the line 19, and are connected to opposite terminals of the winding of a relay $L^4$, which constitutes the substation cut off relay for the radiophone. The winding of this relay is bridged by a condenser $q^2$ through which both ringing and voice currents can pass without substantial impedance. Where the radiophone is attached to a party line substation, this relay $L^4$ may be omitted, since on such party lines there are usually grounds on one side or the other. As will presently appear, the radio circuits described herein are applicable to two-party or four-party lines, with individual metering of the party stations.

Normally, that is to say, when the telephone circuit is not in use, the cut off relay $L^4$ is deenergized and as a consequence the wire $19^c$ is connected through a back contact of the relay through extension wire 24 to the branch 25 connected to the A battery marked $A_1$ in Fig. 3. The wire $18^c$ similarly passes through a back contact of the relay to the extension wire 26 leading to test or listening relay 27 and ground. $18^c$, it will be remembered, leads to the tip or ground side of the line, therefore it is the side which in the radiophone can be made use of with a permanent ground or grounds, without disturbing the balance of the telephone circuit.

The radiophone receiver at the substation A′ is shown as comprising an antenna 28, tuned coupler 29, detector tube 30, audio amplifier tubes 31 and 32, and the usual transformers 33, 34, 35, the last mentioned transmitting the amplified audio waves to the telephone receiver or loud speaker 36. The filament battery is $A_1$. The plate battery is $B_1$ and suitable tuning condensers and coils, tickler coil for regenerative effects, etc., are provided as required. I should remark in passing that this representation of the radio receiver is intended to be typical only. The present invention does not concern itself specifically with the design of the local radiophone sets, and other circuits and apparatus may be substituted for those shown in the diagrams without departure from the invention.

The relay $L^5$ has four pairs of contacts, one pair $27^a$ closing the wires 25 and 37 from battery $A_1$ to the filaments. The second pair $27^b$ closes the wires 25 and 38 so as to put battery $A_1$ on the radiophone transmitter T′, and through the induction coil I′, to ground. The third and fourth pairs of contacts $27^c$, $27^d$, close the wires 39 and 40, forming terminals of the secondary induction coil circuit I′, to the tip and sleeve side of the telephone line respectively, through the back contacts of relay $L^4$. The transmitter T′ is shown hanging upon a hook switch H′ controlling the connection of wires 41 and 42, constituting a parallel link between the battery $A_1$ and the filament bus 43. Thus the filament can be heated and the radiophone put in service either through the agency of the relay $L^5$, or by the switch hook H′. The former is controlled by the radio operator at central, and the latter by the subscriber at the substation. In addition to the hook, the subscriber has a manual switch $h$ by which he can connect the battery wire 42 through a wire 44 to his transmitter T′, coil and ground, so as to energize his talking circuit. I provide an ordinary telephone receiver $t'$ in series with the secondary of the induction coil I′, and I interpose a pair of condensers $q^3$, $q^4$ between the secondary of the induction coil I′ and the receiver $t'$ on the one hand, and the terminals of relay $L^5$ on the other, so that while the subscriber by means of switch $h$ can connect his phone T′—$t'$ for receiving calls over the telephone line, he cannot originate calls thereover from the radiophone extension.

Returning now to the central station, and particularly to the radio department thereof shown in Fig. 3, T represents a broadcasting transmitter, symbolized in very simple form, but supposed to contain the usual elements of power supply, modulator, oscillator and aerial, with suitable amplification of the audio waves supplied on the input side. The jack $J^4$ connected to the amplifier $t^2$ and thence to the transmitter T, symbolizes a group of such jacks or equivalent connecting means such as automatic switches, controlled by dials or keys for connecting any of the wire lines to said radio transmitter.

Detailed appliances, both for the switching and for the radio transmission, are well known in the art, and need no specific description in this specification, my present invention having to do particularly with the method of transmitting by wave radiation to the substations, and of bringing in all conversation originating or received at the substation radiophone over the subscriber's wire line. This includes repetition of modulated radio waves received at the radiophone substation and also originating messages gathered up and to be put through the amplifier $t^2$ on the transmitter T for broadcasting.

It may be explained here that the transmitter T for general purposes is assumed to be the standard wave length transmitter for the local exchange area, to which all of the substations are tuned and upon which they depend both for original messages and programs and for those received and relayed from a distance. There are special cases, however, in which certain groups of radiophone subscribers may desire intercommunication among themselves, and I contemplate therefore the installation of duplicates of this transmitter, which may be connected up for such group use. For example, a chess club desiring to meet, arranges a program, and at the appointed time its members attend at their radiophones, all removing their transmitters T′ from their hooks, while the radio operator at the central station plugs up the multiples of their respective lines through their jacks $J^2$—$J^3$, and connects them on to a special broadcasting transmitter of the type T. This plugging up may be carried out in any desired manner, there being several ways well known in the art for thus connecting telephone lines together. The radio operator then supervises the operation, since any one of the connected subscribers may be speaking through the broadcasting transmitter to the others, and it is necessary to prevent interruption. The same might be said of any meeting of a group of people held in this manner, the most valuable feature of this part of the invention being the absolute control afforded over the transmitted messages. The connection to the broadcasting transmitter is solely within the control of the radio operator at the jack $J^4$ or any other suitable form of switch, and he has it in his power therefore to cut off connection at any time.

Figure 4:
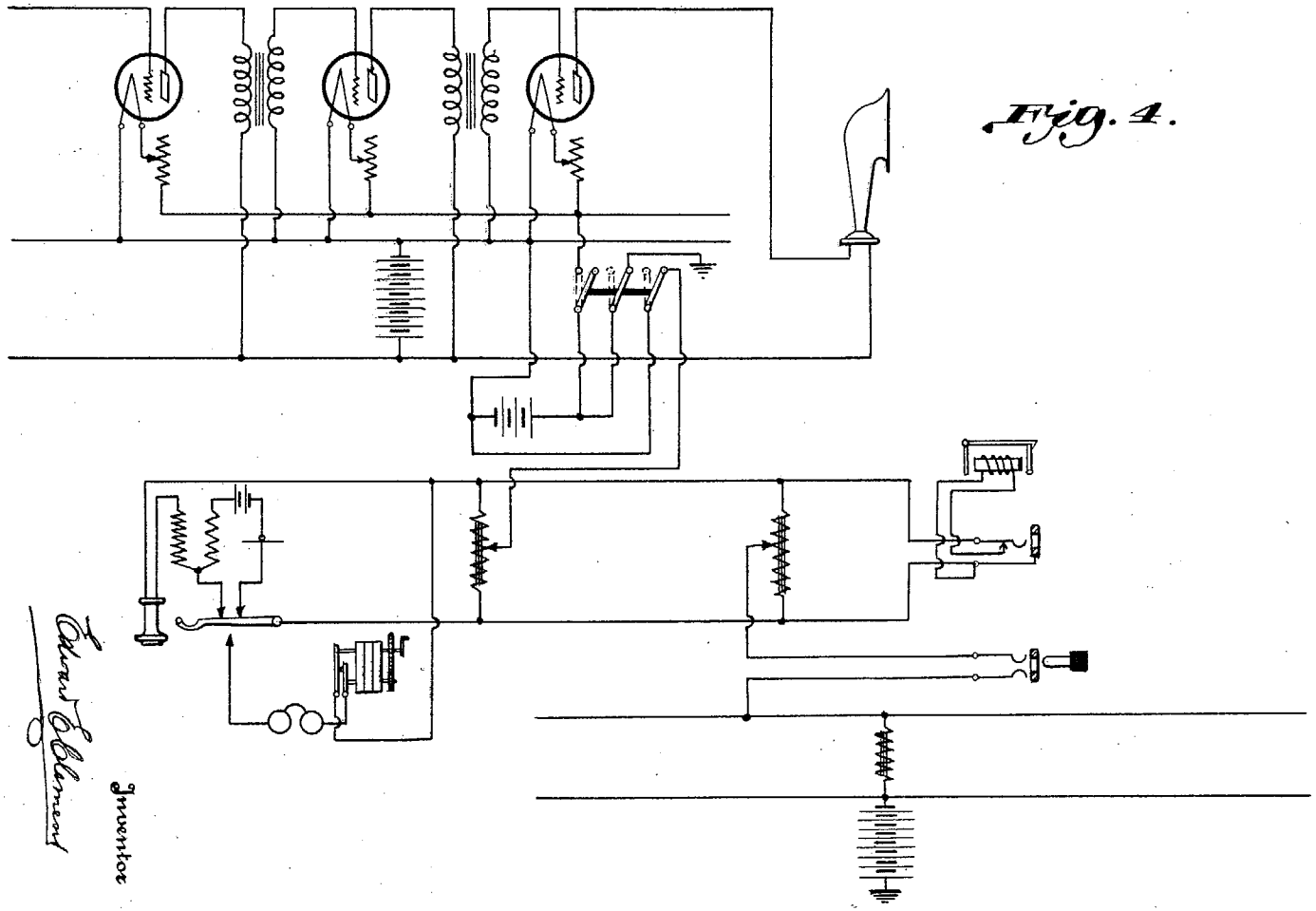
Fig. 4 is a diagram showing a substation battery charged and controlled over a phantom circuit imposed on a metallic magneto telephone circuit.

The cord circuit between plugs $P^2$ and $P^3$ in Fig. 3 is the same as the operator's cord circuit in Fig. 2, but the radio operator also has special test cords such as that shown in the upper part of the figure connected to plug $P^4$ for temporary use in testing. Here the keys K—$k'$ are of standard construction, as in the other cords, and the test contact of the plug $P^4$ is connected through suitable resistance to the supervisory lamp $s^2$ to the radio battery B′ means such as the commutator $p^5$ being provided to give special tone test on the test thimbles of the multiple jacks, J, J′, $J^2$, etc. It will be observed that the constant connection of the sleeve or battery wire 24 at the radiophone substation to the bus wire 25 of the battery $A_1$ produces charging of that battery by the constant flow of current therethrough from the main radio battery B′ at the central office. The amount of energy thus delivered to the battery $A_1$ depends upon the size of the line wires, and the length of time available for such charging. As shown, the battery wire 24 is not cut off except when the cut off relay $L^4$ pulls up which is only when the line wire is in use for conversation. With No. 19 line wires, and using only the sleeve wire for conduction, it would be possible to safely transmit from one-half amperes to two or three amperes, according to the line resistance and the voltage of the battery employed. Where this voltage is standard manual telephone voltage, say 22, and the single wire resistance to the substation is from 25 to 50 ohms, it would be possible to maintain the battery $A_1$ continuously charged, provided the time of discharge be not too long extended, and the charging be not interrupted by other contingencies, such as the excessive telephone use of the line. In Fig. 4 of the drawing I show means for charging such a battery over a phantom circuit composed of the two sides of a magneto telephone line. Such a phantom circuit of course possesses still lower resistance than a single wire of the pair and correspondingly augments the amount of energy that may be delivered without a prohibitive loss. I wish to point out in connection with this, that radio instruments have recently been devised by the commercial radio corporations, and also by the United States Bureau of Standards, which employ rectified alternating current for lighting the filaments of the audion tubes, such currents being stepped down to the usual voltage of the filaments from the voltage of house mains or feeder lines. Using such a type of transformer and rectifier circuit, it is within the scope of my invention to feed the filaments direct, and at the same time charge a floating storage battery $A_1$ if desired, by transmitting over my line wire 19—$19^c$—24 a sine wave current at such voltage as will deliver the necessary energy.

Connected to the key K is a wire 50 containing a supplemental key $k$ to connect the voltmeter or other suitable indicating instrument V and ground. The key $k'$ serves to connect the operator's listening set, and also to put battery on the tip of the plug, by which means current is thrown out on the tip side 18 of the line, then through extensions $18^c$ and back contact of relay $L^4$ to the winding of relay $L^5$ and ground. The operation of these test keys will be obvious from the description. Key $k$ enables the operator to take a reading on the battery $A_1$, the line resistance being known, and the main batteries B, B′ being disconnected both at the cut off relays $L^3$, $L^7$ from the line itself and by the back contacts of key K from the plug $P^4$. This is the most important test because the lamp filaments can be observed by the subscriber, and any defects therein reported over the telephone. A companion test however enables the operator to determine whether the radiophone instrument as a whole is functioning properly, assuming the transmitter T′ to be hung upon its hook H′ and as shown to have its mouth piece turned toward the emission orifice or diaphragm of the radio telephone receiver. Connection of battery B′ to the relay $L^5$ causes the subscriber's telephone set T′, I′, to be connected to line and so to the multiple jack $J^3$, plug $P^4$ and the operator's head phone connected through the listening key $k'$. It is assumed of course that some form of broadcasting is going on from the transmitter T, so that the radio-operator not only gets a test on the performance of the individual subscriber's radiophone, but also gets a test on his own broadcasting transmitter and on the relative tuning of the same with respect to the subscriber's station.

It should be noted that battery B′ in Fig. 3 is connected to the sleeve wires $17^a$, $19^a$ through the contacts of cut off relays $L^6$, $L^7$, energized in parallel with the line cut off relays $L^2$ and $L^3$ either from the radio board or from the telephone switchboard. This enables the central office under all circumstances to keep a talking line balanced and supplied with current only through the connective cord or switch circuits, but as shown in Figs. 5 to 8 inclusive, the connections of the radio battery and that of the main battery are such that the balance is normally maintained, and current is supplied in such a way to the sleeve side of the line that no signaling apparatus on the telephone switchboard is affected thereby.

Figure 5:
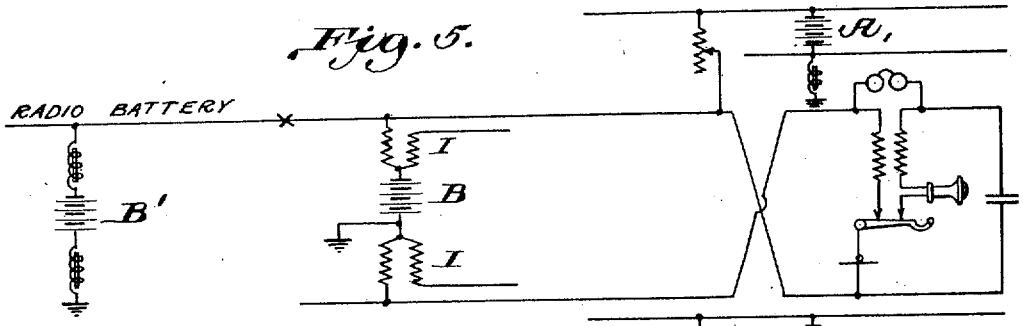
Figs. 5, 6, 7 and 8 are schematic circuits showing methods of connecting the radio battery with relation to the centralized telephone battery.

Fig. 5 shows the condition when a subscriber is talking through the telephone switchboard, the repeating coil I and the main battery B being shown as bridged across the line, and the radio battery B′ permanently connected through the sleeve side to the subscriber's battery $A_1$. Battery supply for both the subscriber's transmitter and the battery $A_1$ would as a matter of fact be drawn in due proportion from each of the centralized batteries B, B′, and the resultant effect would be to divide the load between the two parallel sources, without changing the normal condition.

Figure 6:
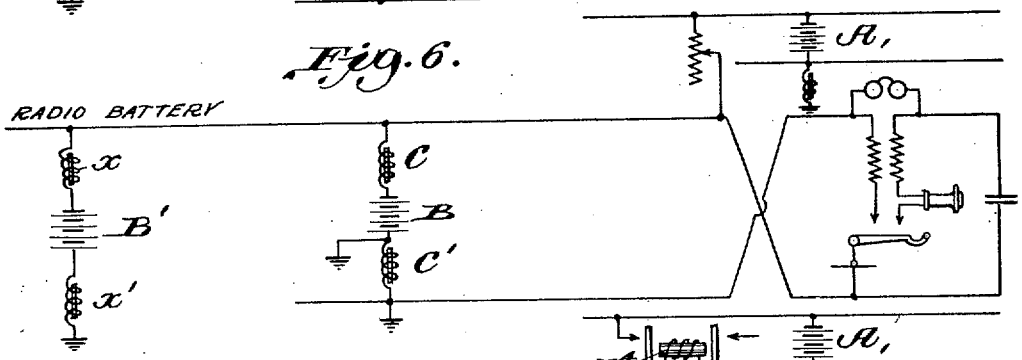

Fig. 6 shows the same arrangement when the subscriber's telephone station is idle, and the main battery B is bridged across the line wires between the two windings $c$—$c'$ of the subscriber's line relay on the telephone switchboard; while the radio battery is connected in parallel to the sleeve side of the line through low resistance choke coils $x$—$x'$ which do not appreciably reduce the potential placed upon the line terminal of the winding 1 of the line relay, which, being exposed to balanced potentials, will not be energized unless the subscriber calls.

Figure 7:
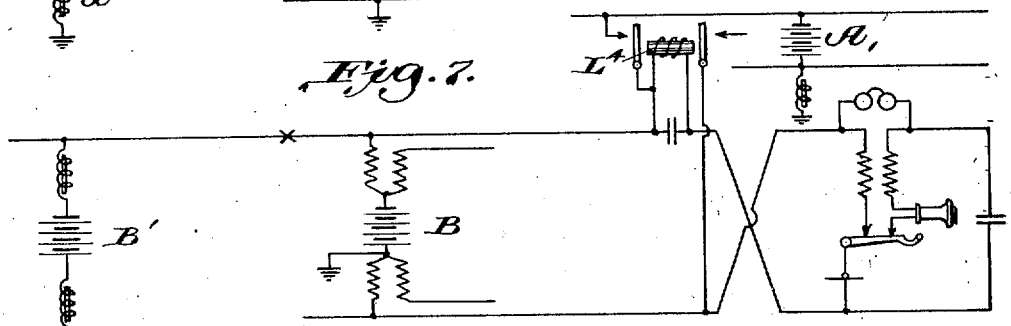
Figure 8:
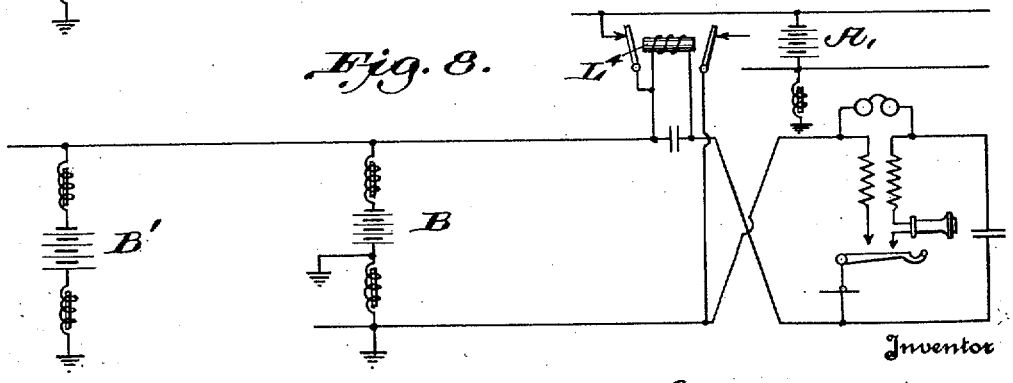

Figs. 7 and 8 show corresponding conditions with the cut off relay $L^4$ at the subscriber's station for detaching the battery $A_1$ when the subscriber is talking.

It is not considered necessary to actually adopt a permanent connection of the radio battery B′ because telephone conversations are usualy brief and the time of use of the current flow in the sleeve wire would not be thereby greatly curtailed. At the same time, I have provided means in the cut off relays $L^6$, $L^7$ to disconnect the battery B′ when the lines are plugged up for conversation as at $x$ in Figs. 5 and 7, and when such cut off relays are employed, the choke coils $x$—$x'$ may be omitted, so that a practically perfect balance may be had across the terminals of the line relay L. In other words, by using the cut off relays $L^6$, $L^7$, of Fig. 3, I am able to dispense with choke coils $x$—$x'$ and connect the battery or charging generator of any type as shown in Fig. 3.

Figure 9:
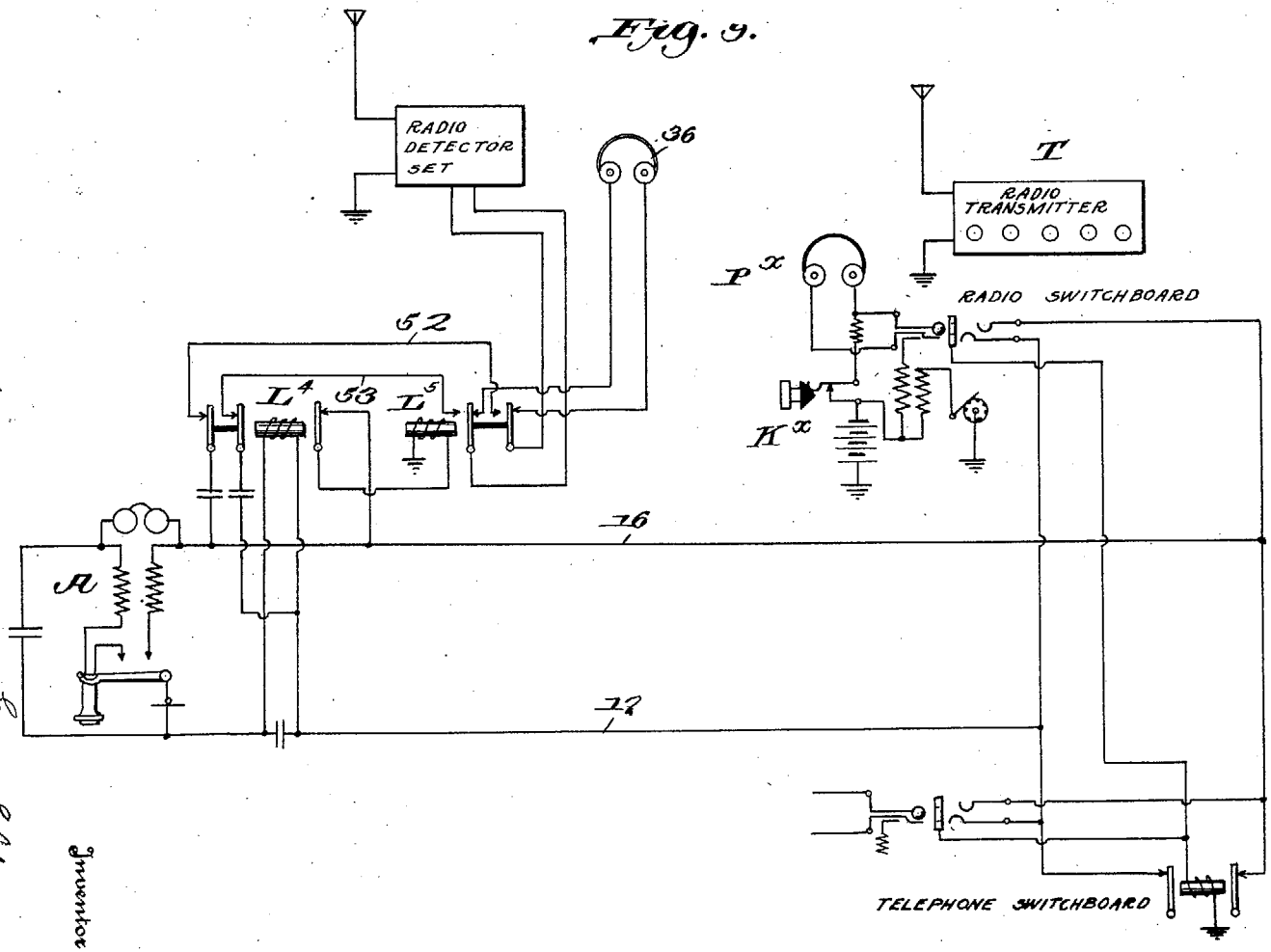
Fig. 9 is a diagram of a modified arrangement of circuits.

Fig. 9 shows a modified circuit in which the telephone switchboard and radio switchboard are provided with multiple line connections as before, the radio switchboard having connections to the radio broadcasting transmitter T and the radio operator having a full equipment of cords and plugs of known types symbolized at $P^x$. The substation is provided with a radio detector set and receiver 36, normally connected to the radio detector set through back contacts of the relay $L^5$, which when energized by means of the operator's key $K^x$ at the radio board, will disconnect the receiver 36 and connect the radio detector set on its audio side directly to wires 52—53 and so through the contacts of cut off relay $L^4$ to the line wires 16—17. As there is no battery shown for the detector set (which is typical only), the radio central battery feed is omitted in this figure, which represents a very simple standardized system in which however the radio operator still has perfect control for all purposes of the substation radiophone. It should be noted that the continued energization of relay $L^5$ disables the radio set, and by winding this relay so as to consume little current, this affords means to disconnect the subscriber's circuit from the radio switchboard until an inspector can make his rounds and the instrument can be removed.

If it be desired to have no grounds on the radio battery busses at substations, such as that on the A battery at station A′, in Fig. 3, the ground wires may be carried through contacts on switch hook H′, opened when the hooks are up. Many other details of operation may be introduced and changes made, without departing from the scope of my invention.

I claim:

1. A broadcasting system comprising primary high power stations using different wave lengths, secondary stations having receiving radio sets tunable to the different primary wave lengths and also having relay transmitting apparatus controlled by the receiving sets and operating on a standard fixed wave length the same for all secondary transmitters, and subscribers' receiving radio stations, grouped around each secondary transmitting station in its local area and tuned permanently to the fixed transmitting wave lengths thereof.

2. A radio system of intercommunication having a plurality of standardized uniform receiving stations divided into groups, all said stations being tuned to one common frequency and of sensitiveness limited to the areas covered by their respective groups, a local transmitting station for each group working on said common wave length, and means for modulating the waves radiated from said transmitting stations as determined by primary stations using variable wave lengths.

3. The combination of a plurality of substations, a central station, a radio broadcasting transmitter at said central station, a radio receiver at each substation, a wire line connecting each substation with the central station and a telephone on each line at each substation, with means at the central station to interconnect the substations for conversation through said wire lines, and means also at said central station supplying operating energy to the radio receivers at the substations over said wire lines.

4. A combined telephone and radiophone system, comprising a plurality of substations, a telephone and a radiophone at each substation, a central station common to said substations, line wires interconnecting the central station and the substations, and common means at the central station supplying operating current to both telephones and radiophones over the said line wires, with means at each substation to differentiate between the two and to prevent interference.

5. In a broadcasting system, a main station, a plurality of substations, means at said main station for generating and transmitting to the substations radio waves, means at the substations for receiving said waves, and individual wire circuits from the main station to the substations, with means at the main station controlling the wave receiving means at the substations over said wire circuits.

6. In a broadcasting system, a main station, a plurality of substations, means at said main station for generating and transmitting to the substations radio waves, means at the substations for receiving said waves, and individual wire circuits from the main station to the substations, with a centralized source of current supply for the substation receiving means, connected to said wire circuits and distributed thereby to the several substations.

7. A broadcasting system comprising a primary station, a secondary distributing station, and a plurality of local receiving stations related to the secondary station and all in permanent tune therewith, means at said secondary station to receive broadcast waves from the primary station at its wave length, and to relay and redistribute the same in its own area at the standard wave length to which its receiving stations are tuned, and means also at said secondary station to determine when its transmitter is actually tuned to the fixed wave length of its receiving stations.

8. In a radio-telephone system, a transmitting station, a receiving station, a wave transmitter at the transmitting station for radiating modulated waves, a receiving set at the receiving station tuned to receive said waves, and a wire circuit connecting the two stations with means to connect it to the receiving set at the receiving station and means to transmit over said wire to the transmitting station modulated current corresponding to the said modulated waves.

9. In a radio-telephone system, a transmitting station, a receiving station, a wave transmitter at the transmitting station for radiating modulated waves, a receiving set at the receiving station tuned to receive said waves, and a wire circuit connecting the two stations with means to connect it to the receiving set at the receiving station, and means at the transmitting station to control said connecting means.

10. In a radio-telephone system, a transmitting station, a receiving station, a wave transmitter at the transmitting station for radiating modulated waves, a receiving set at the receiving station tuned to receive said waves, and a wire circuit connecting the two stations with means to connect it to the receiving set at the receiving station, and means at the transmitting station to control said connecting means through said wire circuit.

11. In a radio-telephone system, a transmitting station, a receiving station, a wave transmitter at the transmitting station for radiating modulated waves, a receiving set at the receiving station tuned to receive said waves, and a wire circuit connecting the two stations with a source of energy for the receiving set located at the transmitting station and means for feeding said set from said source through said wire connection.

12. In a radio-telephone system, a transmitting station, a receiving station, a wave transmitter at the transmitting station for radiating modulated waves, a receiving set at the receiving station tuned to receive said waves, and a wire circuit connecting the two stations with a source of energy for the receiving set located at the transmitting station and means for feeding said set from said source through said wire connection as determined at the transmitting station.

13. A broadcasting system comprising one or more primary transmitting stations operating at variable wave lengths, a localized secondary station, having receiving means capable of variable tuning to receive said variable broadcast waves, and transmitting means connected therewith for relay modulation, but tuned for a fixed wave length, and a plurality of receiving stations related to said secondary station by wire circuits, and having receiving sets tuned to the fixed wave length of said station, with means controlled by an operator at said secondary station and operable through said wire circuit to maintain said secondary station transmitting means and said local station receiving sets in constant tune to a common wave length.

14. The combination of a plurality of substations, a central station, a radio broadcasting transmitter at said central station, a radio receiver at each substation, a wire line connecting each substation with the central station and a telephone on each line at each substation, with means at the central station to interconnect the substations for conversation through said wire lines, and means also at said central station controlling the operation of the radio receivers at said substations over said wire lines.

15. The combination of a plurality of substations, a central station, a radio broadcasting transmitter at said central station, a radio receiver at each substation, a wire line connecting each substation with the central station and a telephone on each line at each substation, with means at the central station to interconnect the substations for conversation through said wire lines, and means also at said central station for testing the radio receivers at said substations through said wire lines.

16. The combination of a plurality of substations, a central station, a radio broadcasting transmitter at said central station, a radio receiver at each substation, a wire line connecting each substation with the central station and a telephone on each line at each substation, with means at the central station to interconnect the substations for conversation through said wire lines, and means also at said central station for connecting and disconnecting the radio receiving apparatus at said substations from said wire lines.

17. The combination of a plurality of substations, a central station, a radio broadcasting transmitter at said central station, a radio receiver at each substation, a wire line connecting each substation with the central station and a telephone on each line at each substation, with means at the central station to interconnect the substations for conversation through said wire lines, and means also at said central station for connecting and disconnecting the radio receiving apparatus at said substations from said wire lines, said means acting automatically to break the radio connections to the wire line when it goes into service telephonically, and to reestablish the same when said telephone connection is taken down or released.

18. A radiophone system of intercommunication comprising a central station, a plurality of substations related thereto, and individual circuits interconnecting the same, each circuit composed, in operation, of a wire line and an ether return or vice versa, and transmitting and receiving means located at the central station and at the substations, adapted to interrelate the ether waves and the wire currents so that modulated radio waves may be transmitted in one direction, and correspondingly modulated waves may be returned over the wire circuit in the other direction.

19. A radiophone system of intercommunication comprising a central station, a plurality of substations related thereto, and individual circuits interconnecting the same, each circuit composed, in operation, of a wire line and an ether return or vice versa, and transmitting and receiving means located at the central station and at the substations, adapted to interrelate the ether waves and the wire currents so that modulated radio waves may be transmitted in one direction, and correspondingly modulated waves may be returned over the wire circuit in the other direction, with means at the central station to control the transmitting means at each substation.

20. A radiophone system of intercommunication comprising a central station, a plurality of substations related thereto, and individual circuits interconnecting the same, each circuit composed, in operation, of a wire line and an ether return or vice versa, and transmitting and receiving means located at the central station and at the substations, adapted to interrelate the ether waves and the wire currents so that modulated radio waves may be transmitted in one direction, and correspondingly modulated waves may be returned over the wire circuit in the other direction, with means at the central station to control the receiving means at each substation.

21. A radiophone system of intercommunication comprising a central station, a plurality of substations related thereto, and individual circuits interconnecting the same, each circuit composed, in operation, of a wire line and an ether return or vice versa, and transmitting and receiving means located at the central station and at the substations, adapted to interrelate the ether waves and the wire currents so that modulated radio waves may be transmitted in one direction, and correspondingly modulated waves may be returned over the wire circuit in the other direction, with means at the central station to control the transmitting and receiving means at each substation.

22. A radiophone system of intercommunication comprising a central station, a plurality of substations related thereto, and individual circuits interconnecting the same, each circuit composed, in operation, of a wire line and an ether return or vice versa, and transmitting and receiving means located at the central station and at the substations, adapted to interrelate the ether waves and the wire currents so that modulated radio waves may be transmitted in one direction, and correspondingly modulated waves may be returned over the wire circuit in the other direction, with means at the central station to control the substation operation.

23. A radiophone system of intercommunication comprising a central station, a plurality of substations related thereto, and individual circuits interconnecting the same, each circuit composed, in operation, of a wire line and an ether return or vice versa, and transmitting and receiving means located at the central station and at the substations, adapted to interrelate the ether waves and the wire currents so that modulated radio waves may be transmitted in one direction, and correspondingly modulated waves may be returned over the wire circuit in the other direction, with means at the central station to control the substation operation over said wire lines.

24. A radiophone system of intercommunication comprising a central station, a plurality of substations related thereto, and individual circuits interconnecting the same, each circuit composed, in operation, of a wire line and an ether return or vice versa, and transmitting and receiving means located at the central station and at the substations, adapted to interrelate the ether waves and the wire currents so that modulated radio waves may be transmitted in one direction, and correspondingly modulated waves may be returned over the wire circuit in the other direction, with switches at the substations controlling the relation of received and transmitted waves, and means at the central station for controlling said switches.

25. A combined telephone and radiophone system comprising a plurality of telephone substations, a telephone central station, line wires interconnecting them, a plurality of radiophone substations, a radiophone central station, means to transmit messages from said radiophone central station to its substations by modulated high frequency waves, means at the radiophone substations to transmit messages telephonically, wire connections between the radiophone substations and the telephone substations, and wire connections between the radiophone central station and the telephone central station.

26. A combined telephone and radiophone system comprising a plurality of telephone substations, a telephone central station, line wires interconnecting them, a plurality of radiophone substations, a radiophone central station, means to transmit messages from said radiophone central station to its substations by modulated high frequency waves, means at the radiophone substations to transmit messages telephonically, wire connections between the radiophone substations and the telephone substations, and wire connections between the radiophone central station and the telephone central station, together with means controlled by a telephone subscriber in calling to disconnect the wire connections between his telephone and the corresponding radiophone.

27. A combined telephone and radiophone system comprising a plurality of telephone substations, a telephone central station, line wires interconnecting them, a plurality of radiophone substations, a radiophone central station, means to transmit messages from said radiophone central station to its substations by modulated high frequency waves, means at the radiophone substations to transmit messages telephonically, wire connections between the radiophone substations and the telephone substations, and wire connections between the radiophone central station and the telephone central station, together with means at each radiophone substation to control the actuating circuits of the radiophone and means also at said radiophone substations for effecting telephone connection with the corresponding line circuit.

28. A combined telephone and radiophone system comprising a plurality of telephone substations, a telephone central station, line wires interconnecting them, a plurality of radiophone substations, a radiophone central station, means to transmit messages from said radiophone central station to its substations by modulated high frequency waves, means at the radiophone substations to transmit messages telephonically, wire connections between the radiophone substations and the telephone substations, and wire connections between the radiophone central station and the telephone central stations, and means controlled by an operator at the radiophone central station to connect and disconnect the wire circuits for telephonic communication between each radiophone substation and the corresponding telephone substation.

29. A combined telephone and radiophone system comprising a plurality of telephone substations, a telephone central station, line wires interconnecting them, a plurality of radiophone substations, a radiophone central station, means to transmit messages from said radiophone central station to its substations by modulated high frequency waves, means at the radiophone substations to transmit messages telephonically, wire connections between the radiophone substations and the telephone substations, and wire connections between the radiophone central station and the telephone central station, together with a centralized source of current supply at each of the central stations, both said sources feeding independently through the line wires to the telephone substations and to the radiophone substations respectively.

30. A combined telephone and radiophone system comprising a plurality of telephone substations, a telephone central station, line wires interconnecting them, a plurality of radiophone substations, a radiophone central station, means to transmit messages from said radiophone central station to its substations by modulated high frequency waves, means at the radiophone substations to transmit messages telephonically, wire connections between the radiophone substations and the telephone substations, and wire connections between the radiophone central station and the telephone central station, together with a centralized source of current supply at each of the central stations, both said sources feeding independently through the line wires to the telephone substations and to the radiophone substations respectively, and means controlled by an operator at the telephone central station to disconnect the radiophone central battery from a line when in use for telephonic conversation.

31. A combined telephone and radiophone system comprising a central station and a plurality of subscribers' stations with line wires interconnecting them, a telephone switchboard containing connective terminals of said line wires for interconnecting the lines for telephonic conversation, a separate radiophone switchboard containing multiple terminals of said lines, a telephone set and a radiophone set at each subscriber's station, and means for calling said sets separately from the telephone switchboard and from the radiophone switchboard respectively.

32. A combined telephone and radiophone system comprising a central station and a plurality of subscribers' stations with line wires interconnecting them, a telephone switchboard containing connective terminals of said line wires for interconnecting the lines for telephone conversation, a separate radiophone switchboard containing multiple terminals of said lines, a telephone set and a radiophone set at each subscriber's stations, means at the telephone switchboard for calling the said telephone set, and means at the radio switchboard for calling either set at will.

33. A broadcasting system comprising primary high power stations using different wave lengths, secondary stations having receiving radio sets tunable to the different primary wave lengths and also having relay transmitting apparatus controlled by the receiving sets and operating on a standard fixed wave length and subscribers' receiving radio stations grouped around each secondary transmitting station in its local area and tuned to the fixed transmitting wave lengths thereof.

34. A radio system of intercommunication having a plurality of standardized uniform receiving stations divided into groups, all the stations in each group being tuned to one common frequency, a local transmitting station for each group working on its common wave length, and means for modulating the waves radiated from said transmitting stations as determined by primary stations using variable wave lengths.

35. A broadcasting system comprising a primary station, a secondary distributing station, and a plurality of local receiving stations related to the secondary station, means at said secondary station to receive broadcast waves from the primary station at its wave length, and to relay and redistribute the same in its own area to its receiving station, and means also at said secondary station to determine when its transmitter is actually tuned to a wave length at which its receiving stations are normally tuned.

36. The combination of a plurality of substations, a central station, a radio broadcasting transmitter at said central station, a radio receiver at each substation, a wire line connecting each substation with the central station and a telephone on each line at each substation, with means at the central station to connect a group of said substation telephones to the radio broadcasting transmitter for broadcasting from said group of substations through said transmitter, and means at each of all of said substations for tuning the radio receiver to the broadcasting transmitter, whereby any one or more of the subscribers at said group of substations may broadcast among themselves and other subscribers outside of the group may listen in at will.

37. A broadcasting system comprising primary high power stations using different wave lengths, secondary stations having receiving radio sets tunable to the different primary wave lengths and also having relay transmitting apparatus controlled by the receiving sets normally operating on a given standard wave length and tunable to a special wave length, and subscriber's receiving radio stations grouped around each secondary transmitting station in its local area normally tuned to the given standard wave length thereof and tunable to said special wave length.

38. A broadcasting system comprising primary high power stations using different wave lengths, secondary low power stations having receiving radio sets tunable to the different primary wave lengths and also having relay transmitting apparatus controlled by the receiving sets normally operating on a given standard wave length, duplicate transmitting apparatus at said secondary stations operable on a wave length different from said given standard wave length, receiving radio stations grouped about each secondary station and means at each receiving radio station for tuning the same to said duplicate transmitter.

39. A broadcasting system comprising a plurality of receiving stations all normally tuned to a common given wave length, a transmitting station for said receiving stations normally working on the said given wave length, means for broadcasting from the transmitting station on a wave length different from said given wave length matter originating at any one or more of a plurality of said receiving stations comprising a sub-group, and means for individually tuning any one of said receiving stations to said second wave length at will.

40. The method of broadcast distribution which comprises primarily transmitting broadcast matter by radiation over a common area at different wave lengths, and relaying the broadcast matter in different local areas to a plurality of receiving stations in each local area at a frequency common to all the receiving stations.

41. The method of broadcast distribution which comprises receiving broadcast matter at each of a plurality of relay stations at different wave lengths and retransmitting the received broadcast matter from each relay station to a plurality of receiving stations grouped about it in a local area on a frequency common to all the receiving stations of a group.

42. The method of broadcasting intelligence which consists in radiating high power electromagnetic waves for long distances over a large area at different wave lengths, transforming energy so radiated to a plurality of separated points within the large area into low power electromagnetic waves of a definite fixed wave length the same for all the received waves at any one point, and reradiating said transformed waves over smaller areas within said large area.

43. The method of broadcasting intelligence which consists in radiating high power electromagnetic waves from a plurality of primary stations by short wave carriers having an identifying energy characteristic for each primary station, receiving the energy so radiated at a secondary station for relay transmission to a group of receiving stations local to the secondary station, changing the received energy into low power carrier waves having an identifying energy characteristic the same for all of the receiving stations of a group and retransmitting the changed wave at low power over a small area including said group of stations.

44. The method of broadcasting intelligence which consists in transmitting from a plurality of broadcasting stations to a plurality of receiving stations grouped about each station, original communication on carrier waves having a wave length characteristic of the broadcasting station, receiving at said broadcasting stations non-original communications on carrier waves having different wave-lengths for the individual non-original communications, and retransmitting the non-original communications at any station on a carrier wave having the wave length characteristic of that station.

45. The method of broadcasting over a system comprising tuned receiving stations which comprises transmitting from a primary station to secondary stations, relaying from the secondary stations to receiving stations in a local area on a common wave length to which the receiving stations are tuned, and controlling the tuning from the secondary stations.

46. The method of operating a telephone exchange system to provide broadcast service which comprises transmitting intelligence broadcast from the central office to the subscribers' stations, and individually transmitting auxiliary operating power to the subscribers' stations by current conduction from the central office.

47. The method of controlling broadcast service over a telephone exchange system which comprises transmitting modulated waves from the central office to the subscribers' stations by carrier current and transmitting the modulations received at the receiving station from the receiving station over the telephone line to the central office.

48. The method of broadcasting intelligence which comprises radiating signal modulated waves in a path from a transmitting station to a receiving station, conductively transmitting operating energy in a parallel path from the transmitting station to the receiving station, demodulating said signal modulated wave at the receiving station by means of the conductively transmitted operating energy, and retransmitting the demodulated wave over said parallel path.

49. The method of controlling radio broadcast distribution which consists in transmitting from one point to another audio frequency modulations on a radio frequency carrier wave, and returning the same modulations to the first point as low frequency waves without a carrier over a tangible conducting medium.

50. The method of controlling radio broadcast distribution which consists in transmitting in one direction through the ether with a return to the transmitting point through a tangible conducting medium, while maintaining proper coordination between the modulations transmitted through the ether and the waves returned through said medium.

51. The method of controlling radio broadcast distribution among subscribers' stations from a central point which consists in transmitting to all said stations in common by means of modulated carrier waves, and returning the same modulations in the form of coordinated electrical waves without a carrier through individual channels to the distributing point.

52. The method of regional broadcast distribution which consists in transmitting waves in common to a plurality of subscribers in a given area and returning coordinated waves derived from said transmitted waves individually from receiving points to the transmitting point.

53. The method of organized radio broadcast distribution which consists in transmitting broadcast matter from a central point over a common area, and conductively and individually supplying operating energy from said central point for actuation and control of receiving instruments at separated points in said area.

54. The method of organized radio broadcast distribution which consists in distributing broadcast waves over a common area, conductively and separately supplying operating current from the same distributing point to receiving points in said area, and causing the diverse forms of energy thus supplied to be properly coordinated and combined at the receiving points to produce proper reception of the signals transmitted.

55. The method of organized radio broadcast distribution in conjunction with organized telephonic communication which consists in distributing radio broadcast waves to subscribers' stations from a central station, controlling and supervising the reception of the broadcast waves over subscribers' telephone circuits, and supplying operating energy for both services over said subscribers' circuits, while maintaining the telephonic apparatus irresponsive to the radio currents, and the radio receiving apparatus irresponsive to telephone currents.

56. The method of controlling radio broadcast distribution which comprises transmitting modulated carrier waves broadcast from a central station to receiving stations, transmitting the modulations from a receiving station to the central station, and at the central station adjusting the relation between the carrier wave frequency and the constants of the circuits at the receiving station to regulate reception at the receiving station.

57. The method of controlling broadcast distribution to selected subscribers which comprises transmitting radio broadcast from a central station and testing, controlling and metering the reception at the subscribers' stations over individual wired connections from the central office.

58. A combined radio and wired broadcast distributing system comprising a plurality of subscribers' stations, a central station, wire connections between said stations, radio transmitting means at the central station, individual radio receiving means at each subscriber's station, responsive to said transmitting means, means at the central station common to a group of said subscribers' stations for connecting any of said group over their respective wire lines with the input of said transmitting means for broadcasting from the subscribers' stations, and operator's supervisory means at the central station for controlling said connection with the transmitting means and for establishing a talking connection with any one or more of said subscribers in the group.

59. A combined radio and wired broadcast distributing system comprising a plurality of subscribers' stations, a central station, wire connections between said stations, radio transmitting means at the central station, individual radio receiving means at each subscriber's station, responsive to said transmitting means, means common to a group of subscribers' stations for connecting them together at the central station for general telephone conversation over said wire connections, and means at the central station for simultaneously connecting one of the stations of said group with the input of said radio transmitting means.

60. A combined radio and wired broadcast distributing system comprising a plurality of subscribers' stations, a central station, wire connections between said stations, radio transmitting means at the central station, individual radio receiving means at each subscriber's station, responsive to said transmitting means, means for connecting a group of subscribers' stations together at the central station for general telephone conversation over said wire connections, and means at the central station for connecting any or all of said group of stations to the input of said radio transmitting means.

61. In a broadcasting system, a current distributing network composed of tuned wave conductors connected by a common transmitting medium and serving a plurality of receiving stations in common, a telephone exchange system having separate wired circuits leading to subscribers' stations, a plurality of broadcast subscribers' stations having broadcast receivers connected in common to said distributing network for common service thereover and individually connected to telephone circuits for individual communication thereover, and a central broadcasting station with transmitting apparatus connected to said distributing network and having access to said telephone circuits for individual communication with said subscribers' stations.

62. In a broadcasting system, the combination of a tuned wave transmitting network and a telephone exchange system, with a broadcasting central station and subscribers' stations having combined broadcast receiving and telephone sets served by said central station, said central station and subscribers' sets being interconnected through both said network and said telephone system.

63. In a broadcasting system, a central broadcasting station and subscribers' stations served therefrom, in combination with a tuned wave distributing network and wired telephone exchange system, with means affording communication between said central station and the subscribers' stations over said network and over said telephone system as independent signaling channels in series, said means being irresponsive to ordinary currents carried on said network and said wires respectively.

In testimony whereof I hereunto affix my signature.

EDWARD E. CLEMENT.